United States Patent [19]

Daniel et al.

[11] Patent Number: 5,493,952
[45] Date of Patent: Feb. 27, 1996

[54] INTERCONNECTING ROTARY AND RECIPROCATING MOTION

[75] Inventors: Michael R. L. Daniel, East Sussex, United Kingdom; Graham H. Fountain, Sydney, Australia

[73] Assignee: Collins Motor Corporation Ltd., East Perth, Australia

[21] Appl. No.: 199,164

[22] PCT Filed: Aug. 19, 1992

[86] PCT No.: PCT/GB92/01529
§ 371 Date: Jun. 15, 1994
§ 102(e) Date: Jun. 15, 1994

[87] PCT Pub. No.: WO93/04269
PCT Pub. Date: Mar. 4, 1993

[30] Foreign Application Priority Data

Aug. 20, 1991 [GB] United Kingdom ............... 9117975

[51] Int. Cl.⁶ ................. F01B 1/00; F01M 1/00; F16C 17/00
[52] U.S. Cl. ............... 92/72; 92/DIG. 1; 92/DIG. 2; 123/196 R; 384/288; 384/397
[58] Field of Search ............... 92/72, 153, DIG. 1, 92/DIG. 2; 123/196 R; 384/288, 397

[56] References Cited

U.S. PATENT DOCUMENTS

| 2,217,912 | 10/1940 | Lindsey . | |
|---|---|---|---|
| 3,017,229 | 1/1962 | Dilworth | 384/288 |
| 3,929,394 | 12/1975 | Hackett et al. | 384/288 X |
| 4,013,048 | 3/1977 | Reitz . | |
| 4,345,797 | 8/1982 | Ballheimer | 384/397 X |
| 5,072,699 | 12/1991 | Pien | 123/196 R X |
| 5,138,991 | 8/1992 | Wojdyla | 123/196 R |

FOREIGN PATENT DOCUMENTS

| 0241243 | 10/1987 | European Pat. Off. . |
| 0293233 | 11/1988 | European Pat. Off. . |
| 774554 | 12/1934 | France . |

Primary Examiner—Edward K. Look
Assistant Examiner—Hoang Nguyen
Attorney, Agent, or Firm—Flynn, Thiel, Boutell & Tanis

[57] ABSTRACT

A pair of opposed pistons (17) are interconnected by a connecting link assembly (19) defining opposed parallel guide surfaces (24), transverse to the axes of the pistons. A drive block (28) is rotatably mounted on a crankpin (16) of a crankshaft by a bearing shell (71a, 71b) and has parallel bearing plates (31) slidably engaged with the guide surfaces (24). Lubricating oil is supplied to ports (59) in the bearing plates, just before each plate is substantially loaded, from leading and trailing drillings (56L and 56T) in the crankpin (16), ports (76, 77) in the bearing shell and passages (73, 74, 75) in the drive block.

5 Claims, 5 Drawing Sheets

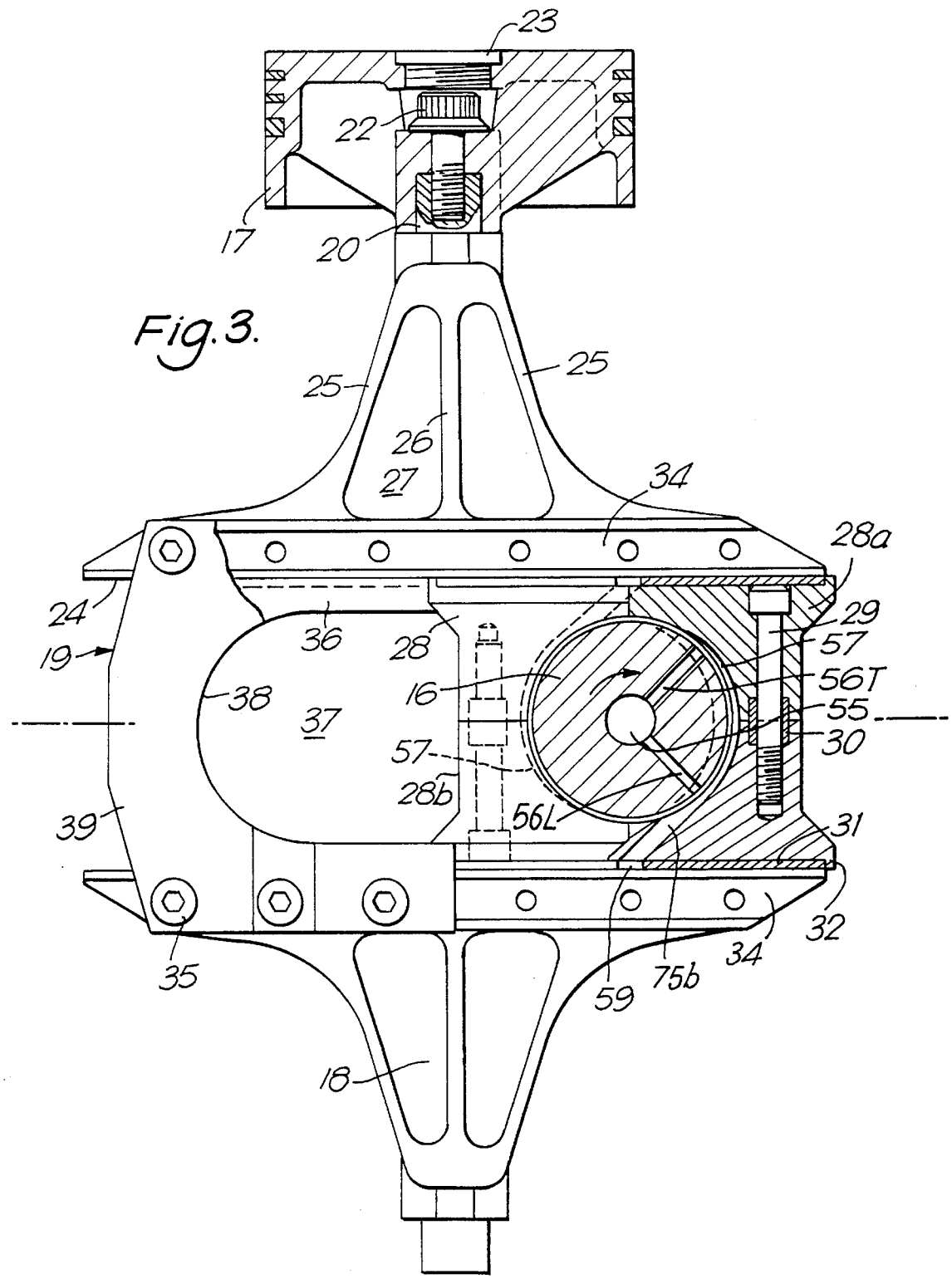

7,493,952

INTERCONNECTING ROTARY AND RECIPROCATING MOTION

FIELD OF THE INVENTION

The present invention relates to apparatus for converting reciprocating motion to rotary motion and vice-versa comprising a reciprocatory assembly guided for reciprocation in a first direction and comprising first and second reciprocating members each terminating in a planar guide surface transverse to the direction of reciprocation, and spacing tie means interconnecting the two reciprocatory members at opposite ends of the guide surfaces to maintain the guide surfaces parallel, spaced apart and facing each other, a drive block having opposed guide faces each slidably engaged with a respective one of the guide surfaces of the reciprocatory members, a rotary member mounted for rotation about an axis transverse to the said direction of reciprocation and having an eccentric portion rotatably engaged in a plain bearing in the drive block and a lubrication system for supplying lubricant under pressure through the rotary member to a plurality of outlet ports in the surface of the eccentric portion, the drive block having a passage leading to the respective guide surfaces from respective ports in the plain bearing positioned to communicate with the outlet ports of the eccentric portion as the latter rotates in its bearing.

BACKGROUND OF THE INVENTION

Such apparatus as described above is particularly suitable for interconnecting a pair of opposed pistons with a crankshaft throw in positive fluid displacement machines such as pumps and internal combustion engines as proposed for example in EP-A 0,241,243.

A problem in such known apparatus is to ensure adequate lubrication the planar guide surfaces under the high loads imposed on them particularly at high speeds.

Apparatus according to the invention is characterised in that the bearing port or ports connected with a guide surface lie within a quadrant of the plain bearing, the two quadrants being on opposite sides of the axis of the bearing, and the outlet ports in the eccentric portion all lie in a sector thereof smaller than the angular extent of the unported portion of the bearing separating ports connected to different guide surfaces of the drive block.

BRIEF DESCRIPTION OF THE DRAWINGS

An embodiment of the invention will now be described by way of example with reference to the accompanying drawings, in which:

FIG. 3 is a sectional view on the line III—III of FIG. 2, on an enlarged scale;

DETAILED DESCRIPTION

Figure 1:
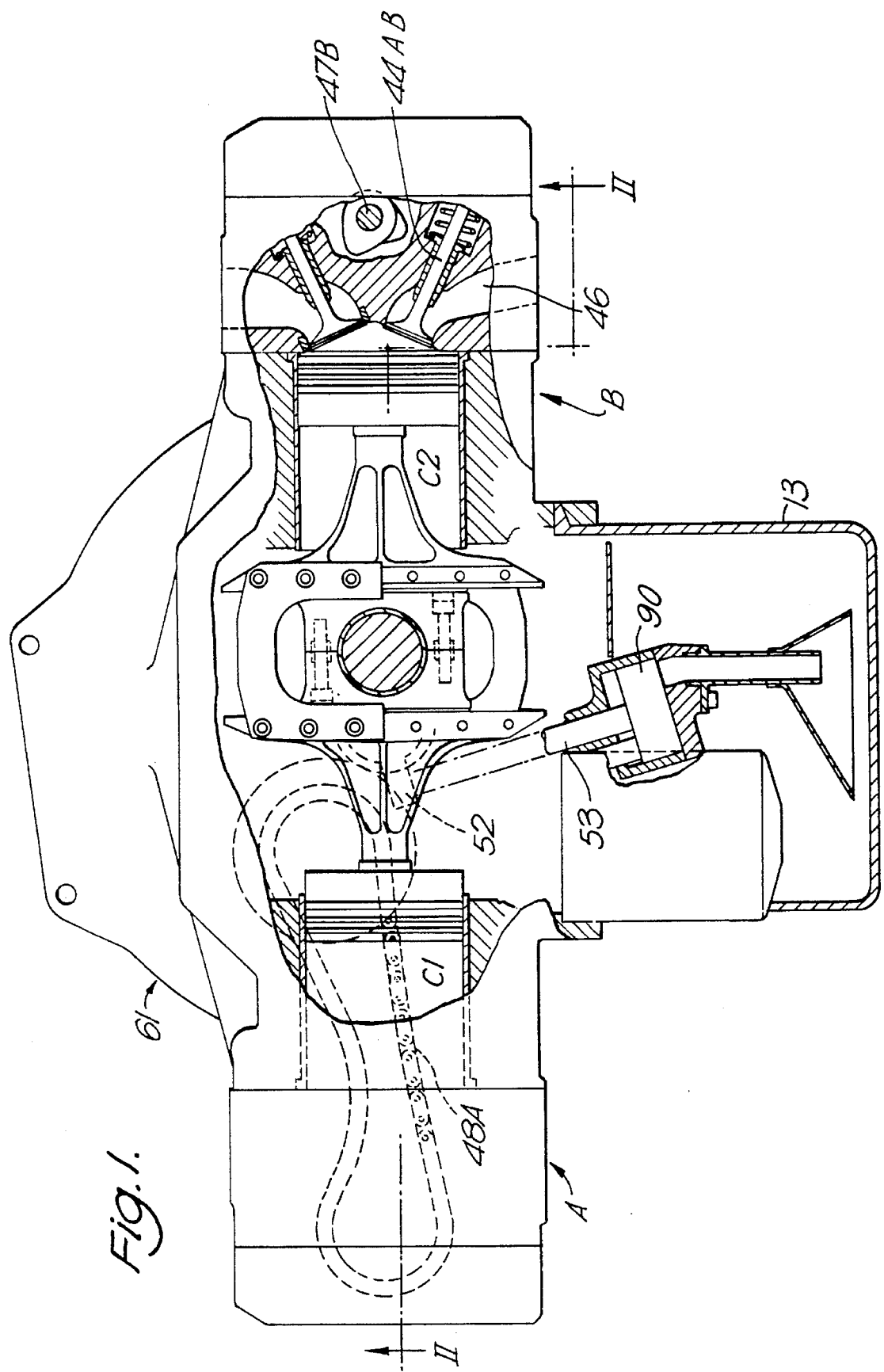
FIG. 1 shows schematically and mainly in section an internal combustion engine according to the invention as seen from the end adjacent the timing gears and chains.
Figure 2:
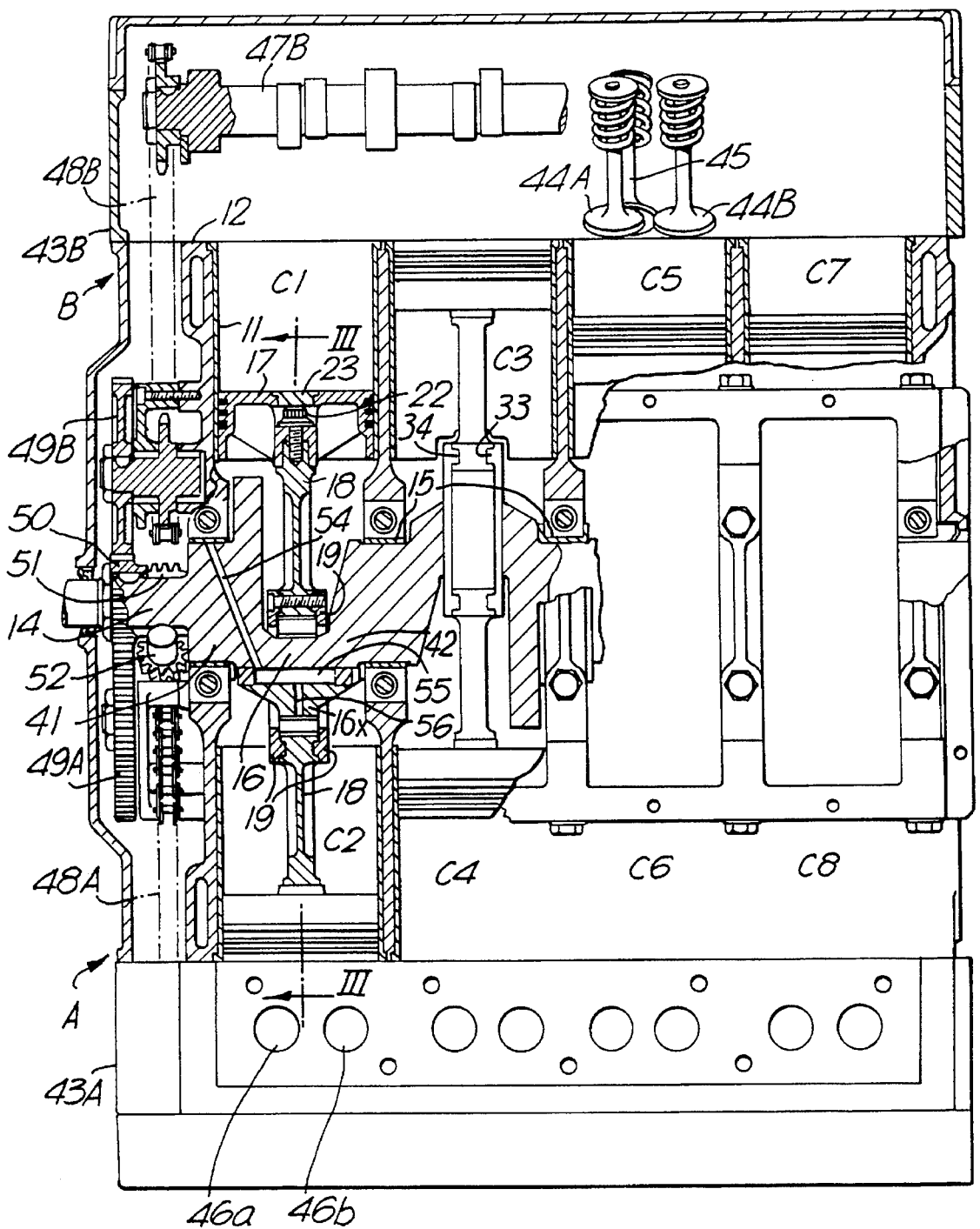
FIG. 2 is a plan view, mainly in section on the line II—II of FIG. 1.

FIGS. 1 and 2 show diagrammatically the principal components of an eight-cylinder horizontally-opposed internal combustion engine having two banks of four cylinders each. The cylinders C1, C3, C5 and C7 are arranged in line in one bank A while the other cylinders C2, C4, C6 and C8 are arranged in line in the other bank B. Each cylinder is formed by a cylinder liner 11 mounted in an engine block 12, the lower end of which is closed in the normal manner by an oil sump 13.

Each pair of opposed cylinders, such as C1 and C2, are coaxial. A rotary member or crankshaft 14 is rotatably mounted in five main bearings 15 in the engine block 12 end has four eccentric portions, i.e. crankpins 16, one for each opposed pair of cylinders. Measured in the direction of rotation of the crankshaft 14, the angular spacings of the crankpins 16 are, from the front of the engine (i.e. the left hand side in FIG. 2) 0°, 180°, 270° and 90°. Thus, the firing order for the engine in four stroke form is 1-6-3-8-4-7-2-5.1.

Each cylinder contains a piston 17. The two pistons 17 of a pair of opposed cylinders such as C1 and C2 are connected together by a reciprocatory connecting assembly shown on an enlarged scale in FIG. 3.

Each connecting assembly consists of a connecting link (18A,18B) for each piston and four connecting plates 19 which are each of a U-shaped formation. Each connecting link 18 has a spigot 20 at one end which engages in a bore in its associated piston 17 and is itself formed with a screw threaded bore to receive a bolt 22 securing the piston to the connecting link. Each bolt 22 has its head located in an aperture in the piston crown and this aperture is subsequently closed by a plug 23 screwed into the centre of the piston.

At its other end, each connecting link 18 widens out to form a long rectangular flat guide surface 24 which is surface-hardened, for example by nitriding. The connecting links 18 are stiffened by appropriate ribs in the form of two outer ribs 25 and a central rib 26, with spaces formed in between the ribs by web portions 27.

A drive block 28 is formed in two halves 28a and 28b which are secured together by screws 29 and are accurately located relative to each other by tubular dowels 30. In opposite faces of the drive block 28 are located bearing plates 31 of appropriate bearing-forming material to slidably engage the guide surfaces 24. Movement of the bearing plates 31 relative to the drive block 28 in the direction along the drive block is prevented by transverse ribs 32 formed at the corners of the drive block.

The two connecting links 18 are secured with their guide surfaces 24 at the correct distance apart by the connecting plates 19 which also reinforce the connecting links against deformation in operation. For this purpose each connecting plate 19 is formed with a rib 33 engaged in a corresponding groove 34 extending along each lateral face of the connecting link 18. The connecting plates 19 are secured to the connecting links 18 by screws 35 having their heads located in counter bores in one connecting plate and having screw threaded portions at their other ends engaged in screw threaded holes in the opposite plate.

The connecting plates 19 have flange portions 36 which extend inwardly from the guide surface 24 towards each other. These flange portions increase the rigidity of the connecting links 18 in the region of the guide surfaces and are themselves surface-hardened to form lateral guide surfaces for the drive block 28 and its bearing plates 31. The flange portions 36 bound the parallel sides of a reentrant 37 having a semi-circular end 38. A reentrant 37 provides clearance for the portions of the crankshaft web immediately adjacent the crankpin 16.

The stiffness of the connecting plates 19 is increased by increasing the thickness of the connecting link portions 39. The distance between the connecting portions 39 on opposite sides of the central plane is reduced by shaping the crankpin 16 between the two plates at each end as shown in FIG. 2. Thus, the radially outermost portion 16x of the crankpin projects radially beyond the radially outer portions of the crankshaft webs 41 and 42. By reducing the distance between the connecting portions 39 of the plates 19, the bending moments in the guide surface portions of the connecting links are further reduced.

As can be seen from FIG. 3, even in the extreme position of its travel along the guide surfaces, the drive block 28 always has some portion on the centre line of the reciprocatory assembly.

Turning again to FIGS. 1 and 2, it will be seen that each bank of cylinders A,B has a respective cylinder head 43A, 43B forming combustion chambers for the cylinders. Each combustion chamber has two inlet valves 44a and 44b and an exhaust valve 45. The cylinder heads may be formed with separate inlet ducts 46a and 46b leading to the respective inlet valves or a single inlet duct supplying both valves may be used instead. Where the engine is a spark-ignition engine, each combustion chamber will include a-spark plug and the inlet manifold branches (not shown) supplying the inlet ducts will include fuel injectors.

The valves 44 and 45 are operated by a camshaft in each cylinder head, the camshafts being of the "single overhead" type operating valves through rocker arms (not shown). The camshafts are themselves driven at half crankshaft speed by roller-chains 48A and 48B on sprockets driven by respective timing gears 49A and 49B meshing both with a gear 50 on the front end of the crankshaft 14.

Also mounted on the front end of the crankshaft 14 is a helical gear 51 meshing with a gear 52 on a shaft 53 driving an oil pump 90 (FIG. 1) which draws oil from the sump 13 and supplies it under pressure to the main bearings 15. Internal drillings 54, 55, 56L and 56T in the crankshaft supply oil from the main bearings to the crankpin bearings in the drive blocks. The drillings 56, 56L and 56T extend at 45° to a radial plane through the crankshaft and crankpin axes.

Figure 4A:
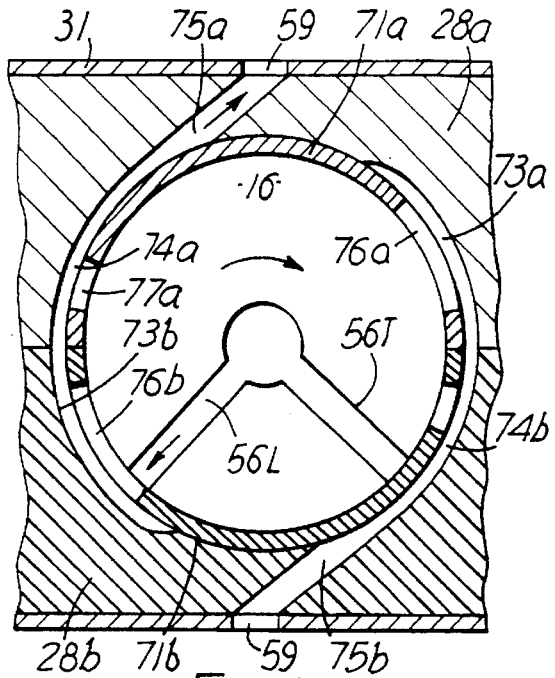
FIGS. 4a to 4h each show the crankpin bearing portion of FIG. 3 on an enlarged scale in eight successive positions during half a revolution of the crankshaft.

As can be seen in FIG. 4a, the crankpin bearing is formed in the usual manner by two shell halves 71a and 71b which meet at the dividing plane between the two drive block halves 28a and 28b. Machined into each drive block half are arcuate recesses 73a and 74a in respect of the block half 28a and 73b and 74b in respect of the block half 28b. The recesses are of approximately the same axial width as their radial depth. Each recess 74 leads into an inclined drilling 75 (75a for drive block half 28a and 75b for drive block half 28b), the recesses 73 and 74 forming one continuous arcuate recess which connects to the respective inclined drilling 75. The outlet of each drilling 75 registers with an oil delivery hole 59 in the centre of the bearing plate 31.

Each bearing shell half 71a and 71b is respectively formed with a relatively long window or opening 76a, 76b extending over 35° and which is spaced from the end of the shell half by 10°. Spaced from the other end of each shell half by 10° is a shorter window or opening 77a, 77b subtending an angle of 15° at the centre of the crankpin. Thus, between the two openings 76 and 77 there is an uninterrupted bearing shell portion subtending an angle of 110°. The majority of this portion is in direct contact with the more highly loaded parts of the drive block, the recesses 73, 74 being formed in the portions which receive little loading transversely of the reciprocating assembly.

Figure 4B:
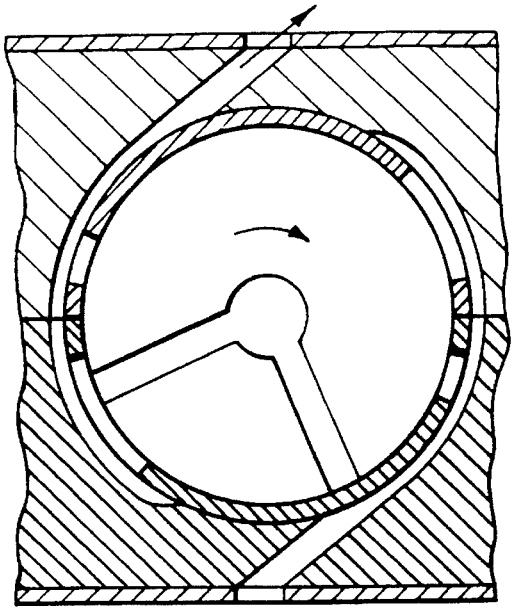

FIG. 4a shows-the position in which the piston 17 in FIG. 3 would be at bottom dead center while the piston which would be attached to the lower end in FIG. 3 would be at top dead center. In this position, the crankpin is accelerating the reciprocating assembly of connecting rods and pistons upwardly. The leading drilling 56L is now in communication with the drilling 75a by way of the opening 76b and the recess 73b, 74a. Although the upper surface of the drive block is loaded, this enables any necessary preliminary filling of the recess and drilling 75a to be completed as the motion continues to the position shown in FIG. 4b.

Figure 4C:
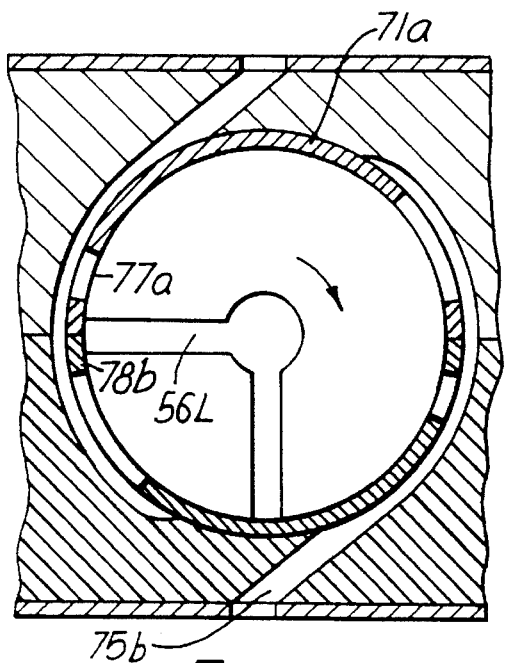

In the position shown in FIG. 4c, the leading drilling 56L has been closed off by the adjacent solid portion 78b which necessary to prevent loss of oil laterally in the axial direction at the interface between the two shell halves.

Figure 4D:
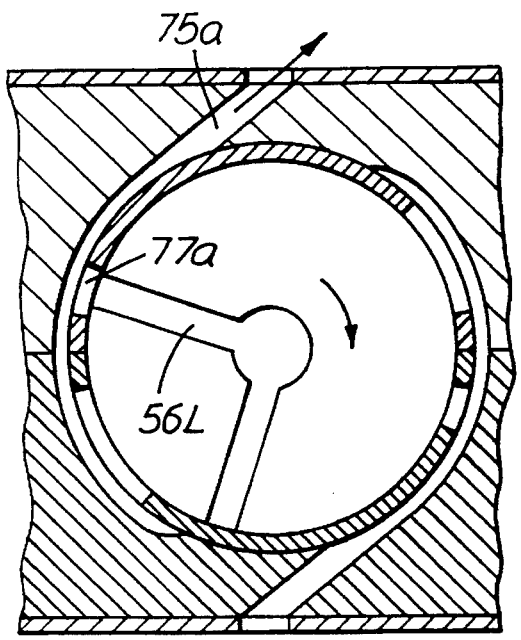

In the position shown in FIG. 4d, the leading drilling 56L is again in communication with the drilling 75a through the opening 77a.

Figure 4E:
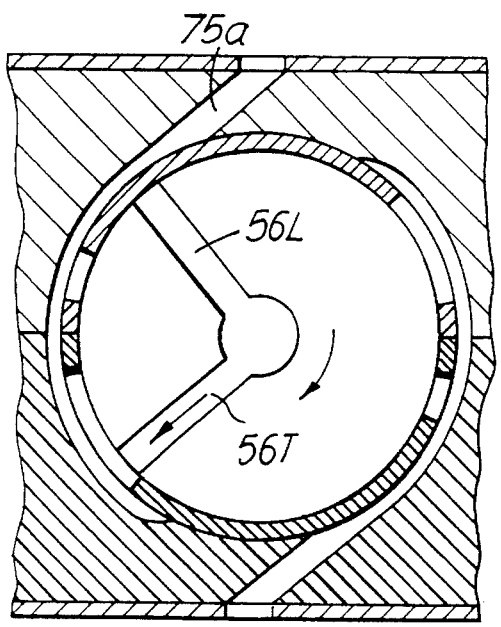
Figure 4F:
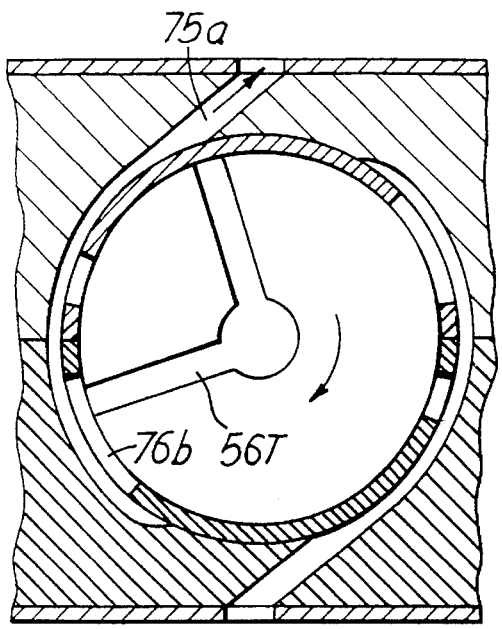
Figure 4G:
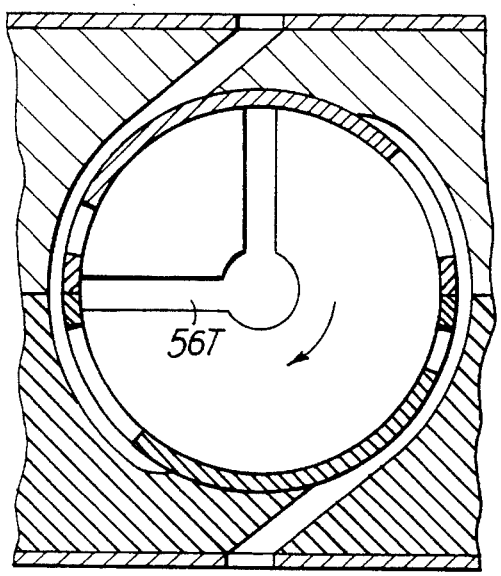
Figure 4H:
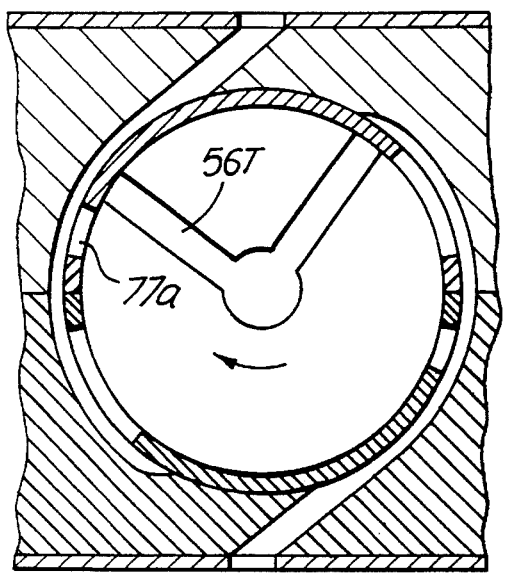

In the position shown in FIG. 4e, the drive block has reached the position which is effectively the mirror image of that shown in FIG. 3 and the vertical acceleration is now zero. Under its inertia, the reciprocating assembly moves upwards in the figure and begins to be restrained or accelerated downwards by the crankpin. This tends to open the small clearance between the planar guide surfaces of the guide block and the guide surface 24, and at the same time, the trailing drilling 56T is nor in communication with the drilling 75a (FIGS. 4e and 4f). Under the pressure from the lubricating system augmented by the centrifical head generated within the rotating crankshaft, oil is supplied under pressure to fill the clearances in the planar bearing on the upper side of the drive block. In FIG. 4g this is temporarily interrupted as the trailing drilling 56T passes across the portion 78b of the shell halves. Finally in FIG. 4h, both drillings are closed off.

It should be noted that throughout the range of movement illustrated from FIG. 4a to FIG. 4h, the lower drilling 75b has been continuously cut off from the oil supply. This prevents any risk of loss of oil from this drilling 75b across to the drilling 75a.

The upper bearing is now fully charged with oil just in advance of the time in which it is to be subjected to its maximum load.

Figure 5:
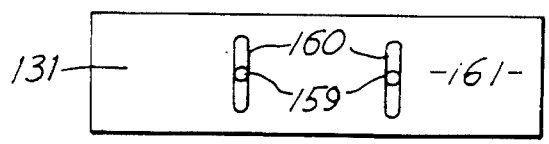
FIG. 5 is a plan view of a modified drive block bearing plate.

FIG. 5 shows a modified form of drive block bearing 131 having more than one oil delivery hole, in this case two delivery holes 159 positioned respectively one third and two thirds of the distance from one end of the plate to the other, with a view to improving the supply and distribution of oil over the whole working area of the bearing plate. Each delivery hole 159 is conveniently supplied with oil from the drive block recess (74a or 74b) by a separate drilling in the drive block.

Distribution may also be improved by the use of grooves 160 formed in the working surface 161 of the bearing plate and communicating with the feed hole 59 or feed holes 159.

We claim:
1. An apparatus for converting reciprocating motion to rotary motion and vice-versa, comprising a reciprocatory assembly guided for reciprocation in a first direction and comprising first and second reciprocating members respectively terminating in first and second planar guide surfaces which extend transverse to the direction of reciprocation, and spacing tie means interconnecting the two reciprocatory members at opposite ends of the guide surfaces to maintain the guide surfaces parallel, spaced apart and facing each other, a drive block having opposed guide faces each slidably engaged with a respective one of the guide surfaces of the reciprocatory members, a rotary member mounted for rotation about an axis transverse to said direction of reciprocation and having an eccentric portion rotatably engaged in a plain bearing in the drive block, and a lubrication system for supplying lubricant under pressure through the rotary member to a plurality of outlet portions defined in a surface of the eccentric portion, the drive block having a respective passage leading to the respective guide face from a respective window in the plain bearing and positioned to communicate with the outlet ports of the eccentric portion as the latter rotates in said bearing, wherein each said window in the bearing lies within a quadrant of the plain bearing, two said quadrants each containing a said window being on opposite sides of the axis of the bearing, and the outlet ports in the eccentric portion all lie in a sector thereof smaller than the angular extent of an unported portion of the bearing which separates the windows as connected to different said guide faces of the drive block.

2. An apparatus according to claim 1, wherein said eccentric portion has two said outlet ports spaced about 90° from each other.

3. An apparatus according to claim 1, wherein said eccentric portion has two said outlet ports in a radially outer region thereof relative to an axis of rotation of the rotary member, the outlet ports lying on opposite sides of a plane through the axes of the rotary member and the eccentric portion thereof.

4. An apparatus according to claim 1, wherein the drive block and the plain bearing are divided into two equal halves at a plane through an axis of the eccentric portion, the plain bearing halves each having a said window near, but spaced from, each end thereof and the drive block has for each guide face a supply passage leading from and connected to one said window of each bearing half.

5. A piston and cylinder machine having at least one pair of opposed pistons on opposite sides of a rotary member in the form of a crankshaft, wherein the pistons of said pair are connected to apparatus as claimed in claim 1.

* * * * *